Nov. 23, 1943.   G. E. HENKEL   2,334,703
ART OF CLARIFYING LIQUIDS
Filed Aug. 8, 1940
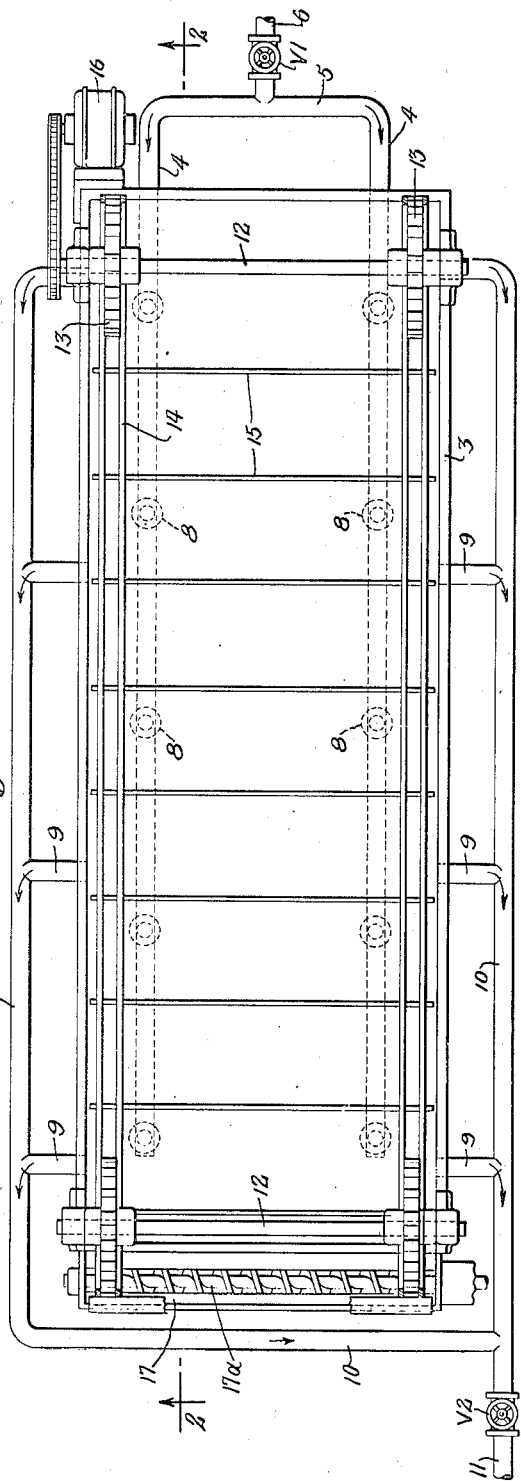
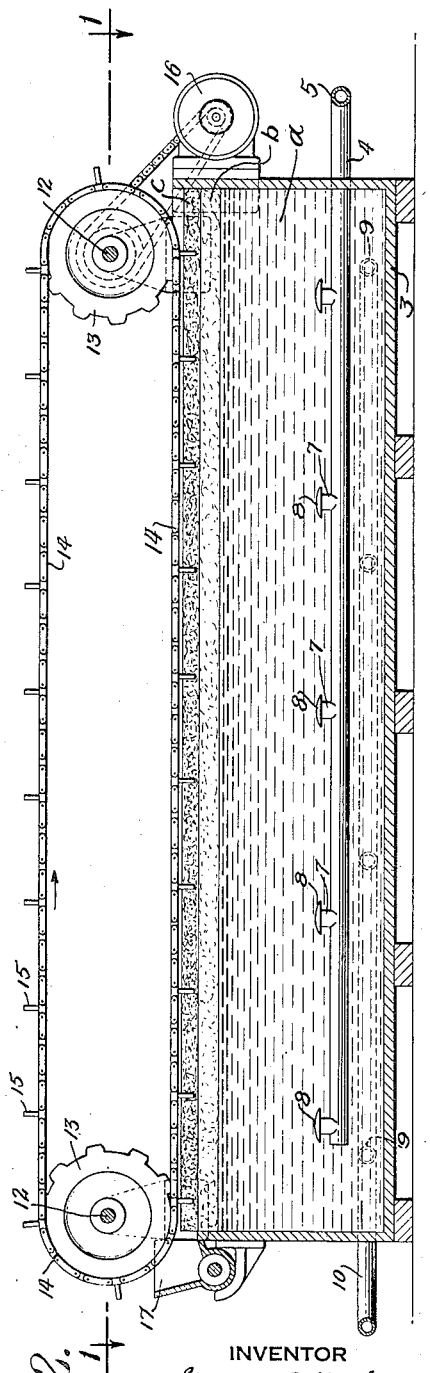
INVENTOR
George E. Henkel
BY
Synnestvedt & Lechner
ATTORNEYS Patented Nov. 23, 1943

2,334,703

UNITED STATES PATENT OFFICE 2,334,703

ART OF CLARIFYING LIQUIDS

George E. Henkel, Cranford, N. J., assignor to American Centrifugal Corporation, New York, N. Y., a corporation of Delaware Application August 8, 1940, Serial No. 351,813

6 Claims. (Cl. 210—53)

This invention relates to the art of clarifying liquids, and is especially useful in connection with the separation of greases, fats, colloids, and finely divided solids from aqueous liquids, such as the liquid effluent from a centrifuge which is handling sludges, for example sewage sludges.

Although the invention, in its broader aspects, is not limited to the field of sewage disposal, it will be herein described with reference to its use in that field, because it is of especial advantage in the handling and disposal of the liquids there dealt with. The objects and advantages of the invention will best be understood after a brief consideration of certain sewage disposal problems, which will now be referred to by way of illustration (though not by way of limitation of the broader aspects of the invention).

In the sewage disposal art, according to one of the systems at present in use, the raw sewage is subjected to one or more stages of gravity settling, which results in the collection of sludges of, for example, 93.75% aqueous liquids and 6.25% solids, greases, etc. Such sludge is then centrifuged, by machines which remove the major part of the heavier solids, disposable by incineration or in other ways, and which discharge as an effluent most of the liquid portion of the sludge. This effluent, however, may contain, as an example, about 3.12% of relatively fine solids, fats, greases, etc.

In such a system, it is quite a problem to dispose of the effluent, because of the remaining contaminants therein, which must either be removed or rendered relatively harmless, before the aqueous effluent can be discharged into a river or other body of water. Attempts have been made to meet this problem by passing the effluent through filtering systems of various types, but the solids and greases tend to clog up or accumulate in the system.

The present invention contemplates, broadly, improvements in method and equipment for overcoming problems such as those above referred to, and particularly for clarifying the effluent from centrifuges, notably by a novel and advantageous method and apparatus for effecting separation of the greases, colloids and fine solids.

More specifically, these purposes are accomplished, according to the present invention, by a novel flotation and skimming method, carried out by improved equipment hereinafter disclosed.

Still more specifically, this method involves a progressive concentration or accumulating of greases, fine solids, and colloids, by flotation; progressive skimming, scraping or otherwise removing the floated concentrated materials, particularly in a periodic or step-by-step manner; and drawing off of the clarified aqueous liquid, particularly by subcanting.

Further, the invention contemplates such a method wherein the progressive removal of the floated concentrated materials is done in a partial periodic manner, i. e. a part only of the floating mass of accumulated or concentrated materials is removed at any one time, so that the remaining layer or layers act as a covering or seal over the surface of the aqueous liquid, which appears to be of great importance in facilitating or promoting the continued separation of the materials by flotation.

Specifically, according to the present preferred practice of the invention, the partial periodic removal of the floated materials is performed once each day, to an amount substantially equaling one day's accumulation, while maintaining on the surface of the liquid at least one day's, and preferably two days', accumulation.

The invention further involves the practice of the method hereinbefore described in such manner that for the greater part of each flotation period (for instance, of each 24 hour period) the body of liquid with its seal of floating materials is left in a quiescent state. This is preferably accomplished by following a periodic practice in the subcanting of the clarified liquid, from the vessel or tank employed, and in the delivery to said tank of the fresh effluent; and by properly coordinating this practice with the skimming procedure. This is best done, according to the invention, by: (1) subcanting the clarified aqueous liquid (which has undergone undisturbed clarification by the flotation process for about 24 hours); (2) delivering beneath the accumulated layer or layers of materials, a new body of effluent to be clarified; (3) skimming or scraping off the upper portion or layer of accumulated materials, preferably only the accumulation of the second or third preceding day; and (4) allowing the body of liquid with its floating seal of one or two days' accumulation to lie quiescent for another similar period of approximately 24 hours; and so on.

The invention further contemplates a method such as above described which includes also the aeration of the liquid prior to the flotation part of the operation. This is particularly advantageous in the treatment of materials having a high content of greases, such as sewage centrifuge effluent, and according to the preferred practice this aeration step is accomplished by violent agitation of the effluent, in the presence of air, immediately prior to the delivery of the effluent into a tank where it remains quiescent for separation by flotation.

The invention further contemplates, for the practice of such a method, an equipment comprising a tank or the like for holding the liquid undergoing clarification, having at or near its top a skimming mechanism periodically actuable to remove floating materials layer-by-layer, and having at or near its bottom a piping system or the like, constructed to withdraw or subcant clarified liquid and to deliver liquid to be clarified; the piping system being so constructed and arranged that a diffusion or baffling of the liquid, particularly when entering the tank, is effected, so as to prevent turbulent disturbance of the floating seal of concentrated greases and other materials.

How the foregoing objects and advantages are secured, together with such others as may be incident to the invention, will appear from the following description, taken together with the accompanying drawing, wherein—

Figure 1 is a plan view of the preferred form of equipment for practicing the method of the invention, certain parts being in section on the line 1—1 of Figure 2; and Figure 2 is a vertical section taken on the line 2—2 of Figure 1, with the contents of the tank shown in a manner to illustrate a typical practice of the method of the present invention.

It will be observed that the clarifier tank 3 has an inlet manifold comprising a plurality of horizontal pipes 4 and a cross or interconnecting pipe 5 which latter is fed through a supply line 6 controlled by valve V1. Pipe 6, in a typical installation, would be the effluent pipe from a centrifuge handling sewage sludge. The pipes 4 lie near the bottom of the tank and have each a plurality of outlets 7 with outlet baffles 8 located adjacent thereto, whereby the incoming liquid is diffused throughout the bottom of the tank, without turbulence.

Although the same manifold or pipe system may by suitable valve control be utilized for subcanting the clarified liquid, I prefer to employ a separate subcanting manifold, comprising two series of pipes 9, opening into the tank near the bottom thereof, which drain into a couple of pipes 10, which latter are joined to become a discharge conduit 11, controlled by valve V2.

Adjacent the top of the tank is a scraper mechanism comprising shafts 12, sprockets 13 fixed thereon, chains 14 mounted on said sprockets, and scraper blades 15 mounted on said chains. Suitable guides (not shown) may be used to keep the scraper mechanism from sagging. The direction of run of the chains is indicated by an arrow, and this scraper system may be turned in that direction by hand or by a suitable motor 16.

Adjacent the end of the tank toward which the effective pass of the scraper moves, I place a collection trough 17, over the edge of which the scraper blades turn, and into which they discharge the materials as scraped from the body of liquid in the tank. From the collection trough, the accumulated greases, solids, etc. can be removed in any desired manner, as by screw 17a, for disposal in any preferred way.

The method or process of the invention is best understood by reference to Figure 2, wherein the strata of materials within the tank 3 are illustrated. The major body of the contents of the tank, indicated at a, comprises a current charge which has been delivered through the inlet manifold, for example one day's delivery of effluent from the centrifuge, and this body a is undergoing a separation, by flotation of the greases with entrained colloids and fine solids; all of these materials or contaminants gradually rising through the quiescent liquid, and leaving clarified liquid adjacent the bottom. The progressive shading indicates the progressive flotation which is taking place.

The layer b represents (in the example being used for illustration) the preceding day's floated and concentrated materials, which, in order to secure the utmost results from the invention, must not be appreciably disturbed when scraping off one or more superjacent layers.

The layer c represents the floated and concentrated materials of the one-day period preceding that of layer b. According to a typical practice of the invention, this layer is ready to be scraped off.

In initially starting the operation of the system, for example in a sewage disposal plant employing centrifuges for removing the major proportion of the solids from the sludge, a day's run of the centrifuge effluent would be fed into the clarifier and allowed to stand for about 24 hours. Subcanting of the clarified liquid would then be effected, and the tank refilled with effluent from the centrifuge, which would in turn be permitted to stand quiet for about 24 hours. Thereupon the clarified liquid would again be subcanted, and a new charge of effluent delivered into the tank, and the concentrated or accumulated greases and solids of the first day's flotation would then be scraped off or otherwise removed, leaving the second day's flotation of materials in place upon the third day's mass of liquid undergoing clarification.

With the operation of the method thus established, each day thereafter the following steps would take place: one day's clarified liquid would be subcanted; an equivalent charge of effluent would be delivered to the tank; one day's accumulation of floated materials would be scraped off; and the tank would then remain quiet for another 24 hours (approximately).

From the foregoing it will be evident that both the decanting and the refilling should be subject to fairly close control, particularly so that the level of the top layer of floated materials can be brought to the proper height with relation to the scraper mechanism. For this purpose the valves V1 and V2 are provided; and the control of these is to be coordinated with the operation of the scraper mechanism, in a manner to carry out the method described. In Figure 2, the decanting and refilling have just been completed, and the refilling has been carried to such a point that the floated layer c (of the second day preceding) has been brought up above the discharge edge at the left end of the tank, ready for removal by operation of the scraper.

While probably not essential in all fields, I find that aeration of the liquid to be clarified, for example by violent agitation thereof just before delivery to the tank (which aeration may be accomplished by the action of the centrifuge itself, or by supplemental or alternative means such as air jets or mechanical agitating means—not shown), serves to speed up the flotation process and to render it more thorough.

In typical actual practice, where the centrifuge effluent has contained an average of 3.12% of the contaminating materials in question, and this has been subjected to the day-by-day process as above described, the average purity of the clarified water drawn off has been 99.64%; i. e. it has had a remaining contaminants content of only .36%.

The advantages of this will be quite evident to those skilled in the art, particularly in the field of sewage disposal; and it is thought that the manner in which the invention accomplishes the various objects and advantages set out at the beginning of this specification will now be clear, without further elaboration. It is also obvious that various changes in timing of the cycle of the method, or in parts thereof, or in equipment employed, may be made within the spirit and scope of the invention as defined by the appended claims.

I claim:

1. The method of clarifying an aqueous liquid containing materials to be removed, which comprises separating such materials from the liquid by flotation in a manner to form successive periodic accumulations of the materials on the surface of the liquid, removing floated materials at the top thereof while continuously maintaining at least one such periodic accumulation of said materials on the surface of the liquid, and withdrawing clarified liquid and replacing it with fresh liquid to be clarified.

2. The method of claim 1 wherein the removal of floated materials is done in a periodic manner.

3. The method of clarifying an aqueous liquid containing materials to be removed, which comprises aerating the aqueous liquid and delivering it in a periodic manner to a zone of treatment, there separating such materials from the liquid by flotation and maintaining the body of liquid in said zone in a quiescent state during the flotation separation, and removing floated materials at the top while continuously maintaining an accumulation of such materials on the surface of the liquid.

4. The method of claim 1 wherein the flotation is done upon periodically replaced volumes of the aqueous liquid and the removal of floated materials is done in a periodic manner, each removal being of the top layer, in an amount substantially equal to the accumulation of one flotation period.

5. A flotation process for clarifying aqueous liquids containing materials to be removed, which process comprises admitting a charge of such liquid to a separating tank, maintaining a period of quiescence thereafter while forming at the surface by flotation a layer of material to be removed, withdrawing clarified liquid from a point below the level of said layer, admitting a fresh charge of liquids to be clarified, and from time to time removing a portion only of the floated material, leaving after each such removal a layer of material covering the surface of the liquid undergoing clarification.

6. The process of claim 5 in which the liquids to be clarified are aerated prior to being admitted to the tank.

GEORGE E. HENKEL.